US010023937B2

(12) United States Patent
Ogata et al.

(10) Patent No.: US 10,023,937 B2
(45) Date of Patent: Jul. 17, 2018

(54) ADSORBENT FOR RARE EARTH ELEMENT AND METHOD FOR RECOVERING RARE EARTH ELEMENT

(71) Applicant: NATIONAL INSTITUTE OF ADVANCED INDUSTRIAL SCIENCE AND TECHNOLOGY, Tokyo (JP)

(72) Inventors: Takeshi Ogata, Tsukuba (JP); Mikiya Tanaka, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 222 days.

(21) Appl. No.: 14/862,866

(22) Filed: Sep. 23, 2015

(65) Prior Publication Data

US 2016/0010178 A1 Jan. 14, 2016

Related U.S. Application Data

(63) Continuation of application No. PCT/JP2014/058323, filed on Mar. 25, 2014.

(30) Foreign Application Priority Data

Mar. 25, 2013 (JP) ................................ 2013-061922
Aug. 26, 2013 (JP) ................................ 2013-174697

(51) Int. Cl.

| | |
|---|---|
| ***C22B 59/00*** | (2006.01) |
| ***C22B 3/24*** | (2006.01) |
| ***B01J 20/26*** | (2006.01) |
| ***B01J 20/34*** | (2006.01) |
| ***B01J 20/30*** | (2006.01) |
| ***B01J 20/10*** | (2006.01) |
| ***C02F 1/28*** | (2006.01) |
| ***B01J 20/32*** | (2006.01) |
| ***B01J 20/22*** | (2006.01) |
| ***C08F 110/02*** | (2006.01) |
| ***C08F 110/06*** | (2006.01) |
| ***C08G 73/02*** | (2006.01) |
| ***C22B 7/00*** | (2006.01) |
| ***C08K 3/36*** | (2006.01) |
| *C02F 101/10* | (2006.01) |

(52) U.S. Cl.

CPC ............ *C22B 59/00* (2013.01); *B01J 20/103* (2013.01); *B01J 20/22* (2013.01); *B01J 20/261* (2013.01); *B01J 20/265* (2013.01); *B01J 20/3071* (2013.01); *B01J 20/321* (2013.01); *B01J 20/3204* (2013.01); *B01J 20/328* (2013.01); *B01J 20/3212* (2013.01); *B01J 20/3251* (2013.01); *B01J 20/3259* (2013.01); *B01J 20/3425* (2013.01); *B01J 20/3475* (2013.01); *C02F 1/288* (2013.01); *C08F 110/02* (2013.01); *C08F 110/06* (2013.01); *C08G 73/02* (2013.01); *C08G 73/0206* (2013.01); *C08K 3/36* (2013.01); *C22B 3/24* (2013.01); *C22B 7/006* (2013.01); *C02F 1/285* (2013.01); *C02F 1/286* (2013.01); *C02F 2101/10* (2013.01); *Y02P 10/234* (2015.11)

(58) Field of Classification Search

CPC ........ C22B 59/00; C22B 3/24; B01J 20/3208; B01J 20/22; B01J 20/265; B01J 20/103; C08G 73/02; C02F 1/288

USPC .......... 252/184; 210/660, 670; 502/401–404; 524/582, 585, 612; 423/21.1, 21.5

See application file for complete search history.

(56) References Cited

U.S. PATENT DOCUMENTS

| | | | | |
|---|---|---|---|---|
| 4,540,486 A * | 9/1985 | Ramsden | B01J 39/26 | 210/198.2 |
| 2010/0319491 A1 | 12/2010 | Sugahara et al. | | |
| 2012/0004458 A1 * | 1/2012 | Sakaki | C07C 231/02 | 562/567 |

FOREIGN PATENT DOCUMENTS

| | | |
|---|---|---|
| JP | 2007-327085 A | 12/2007 |
| JP | 2009-160495 A | 7/2009 |
| JP | 2009-249674 A | 10/2009 |
| JP | 2011-1584 A | 1/2011 |
| JP | 2011-231366 A | 11/2011 |
| JP | 2012-184503 A | 9/2012 |
| JP | 2013-1964 A | 1/2013 |

(Continued)

OTHER PUBLICATIONS

Ogata et al., “Immobilization . . . rare earth elements” Chem. Lett. May 23, 2014, 43, pp. 1414-1416.*

(Continued)

*Primary Examiner* — Steven J Bos

(74) *Attorney, Agent, or Firm* — Westerman, Hattori, Daniels & Adrian, LLP

(57) ABSTRACT

An adsorbent for rare earth element and a method for recovering a rare earth element, in which a rare earth element contained in an aqueous solution can be simply and inexpensively adsorbed and recovered, and a rare earth element present in an aqueous solution in combination with a base metal can be selectively adsorbed and recovered. The adsorbent includes a base material and diglycolamic acid introduced into the base material. The method for recovering a rare earth element includes steps of: bringing an aqueous solution containing a rare earth element into contact with the adsorbent for rare earth element to allow the rare earth element to be adsorbed on the adsorbent for rare earth element; and desorbing the rare earth element adsorbed on the adsorbent for rare earth element with an acid of 1 N or less.

6 Claims, 14 Drawing Sheets

(56) References Cited

FOREIGN PATENT DOCUMENTS

| | | | |
|---|---|---|---|
| JP | 2014-148738 | * | 8/2014 |
| WO | 2014-157225 | * | 10/2014 |

OTHER PUBLICATIONS

Gupta et al, "High-performance . . . Proteins" Analytical Biochemistry, 128, pp. 196-201, 1983.*

Partial translation of JP-2014-148738, Aug. 21, 2014.*

Zhang, et al., "Preparation of a Novel Macroporous Silica-based Diglycolamide Derivative-impregnated Polymeric Composite and its Adsorption Mechanism for Rare Earth Metal Ions", Adsorption Science & Technology, Jan. 4, 2008, vol. 25, No. 5, pp. 257-272, filed in IDS on Sep. 23, 2015 (17 pages).

Naganawa et al., "A New "Green" Extractant of the Diglycol Arnie Acid Type for Lanthanides", Solvent Extraction Research and Development, vol. 14, 2007, pp. 151-159.

Baba et al., "Selective Recovery of Dysprosium and Neodymium Ions by a Supported Liquid Membrane Based on Ionic Liquids", Solvent Extraction Research and Development, Japan, vol. 18, pp. 193-198.

Matsunaga, "Recognition, separation and concentration of metal ions with chelating resins or chelating reagent impregnated resins" (Review), Bunseki Kagaku, vol. 50, No. 2, pp. 89-106 (2000).

International Search Report dated Jun. 24, 2014, issued in counterpart Application No. PCT/JP2014/058323 (2 pages).

* cited by examiner (1) AN EXAMPLE OF PREPARATION OF AN ADSORBENT FOR RARE EARTH ELEMENT (2) ANOTHER EXAMPLE OF A CARRIER (3) DIGLYCOLIC ACID

Fig. 11

| SAMPLE | SPECIFIC SURFACE AREA [$m^2$/g] | AVERAGE PORE SIZE [Å] | WHOLE PORE VOLUME [mL/g] |
|---|---|---|---|
| AMINO-SILICA GEL | 208 | 193 | 1.00 |
| ADSORBENT D | 193 | 174 | 0.840 |

ADSORBENT FOR RARE EARTH ELEMENT AND METHOD FOR RECOVERING RARE EARTH ELEMENT

TECHNICAL FIELD

The present invention relates to an adsorbent for rare earth element and a method for recovering a rare earth element in which a rare earth element dissolved in an aqueous solution is adsorbed and recovered.

BACKGROUND ART

Rare earth elements are also referred to as Rare Earth and refer to a group consisting of 17 elements of scandium (Sc/21), yttrium (Y/39), and lanthanum (La/57) to lutetium (Lu/71) (the terms inside the parentheses represent the symbol of element/atomic number). In the position of the periodic table, rare earth elements are elements from the 4th period to the 6th period in group 3. Hereinafter, an element may be represented by the symbol of element.

Rare earth elements have similar chemical properties with each other. The elements other than scandium which has a little different properties and promethium which is not present in nature occur together in the same ore and are hardly separated as an element. On the other hand, although rare earth elements are present in the earth's crust at a higher proportion than gold, silver, and the like, rare earth elements are classified into rare metals since it is difficult to separate and purify the single element.

The rare earth elements have wide applications for permanent magnets, catalysts, phosphors, and the like and are indispensable in the most advanced industries. However, with respect to the supply structure of rare earth elements, the production of rare earth elements are unevenly distributed across the countries, and vulnerability is pointed out. For stably securing future rare earth resources, recycling (recovery) will be important in addition to a search for new ore deposits, development of alternate materials, reduction in the amount of use, and a strategic stockpile.

Known methods for recovering a rare earth element dissolved in an aqueous solution include a solvent extraction method utilizing a phosphate-based extractant (Patent Literature 1) and a precipitation method with an alkali, oxalic acid, and the like (Patent Literature 2).

A solvent extraction method such as that described in Patent Literature 1 is a method capable of performing continuous operation and excellent in separation performance, but the method requires large-scale facilities and is not efficient when the concentration of an objective material to be recovered is low. A precipitation method such as that described in Patent Literature 2 is a method that is simple and excellent in cost, but the method is not suitable as a separation technique from a dilute solution.

When the concentration of an element to be separated is low, an adsorption method is effective as a separation technique. Methods for adsorbing and recovering a rare earth element include a method utilizing a polymer (Patent Literature 3) and a method utilizing a material derived from organisms (Patent Literature 4). Further, commercially available adsorbents, such as strongly acidic cation exchange resins and iminodiacetic acid-based chelate resins, also show adsorption ability for rare earth elements.

However, the above adsorbents have a problem in that they do not have selectivity to rare earth elements. Among base metals, iron is particularly contained in wastes at a high level and is present in various types of waste liquids in combination with rare earth elements. In aqueous acids, iron (III) ions are trivalent ions similar to rare earth element ions. Therefore, iron (III) ions are co-adsorbed with rare earth elements onto an adsorbent, such as a commercially available ion-exchange resin and a chelate resin. Particularly, when the concentration of iron ions is high and the concentration of rare earth elements is low, the above tendency will be remarkable.

On the other hand, in a process of removing iron as an iron hydroxide precipitate, a large amount of alkali is required since the concentration of iron is high; and the iron hydroxide precipitate produced is very poor in filterability and hardly separated from the liquid. Therefore, the process of removing iron is costly and unsuitable for a process of recovering low-concentration rare earth elements.

Further, the process of recovering low-concentration rare earth elements is often performed in a low pH region. However, since an adsorbent utilizing a material derived from a polymer (Patent Literature 3), an adsorbent utilizing a material derived from organisms (Patent Literature 4), an iminodiacetic acid-based chelate resin, and the like develop adsorption ability only in a weakly acidic region, pH adjustment will be required as a pretreatment of the adsorption and recovery process, which increases the cost.

From such a point of view, it is necessary to develop an adsorbent for rare earth element having high selectivity to rare earth element ions in a low-acid solution in the presence of base metal ions in combination with the rare earth element ions.

A solution containing a high concentration of rare earth elements which are relatively easily recovered has been a target of treatment since the price of rare earth elements has been less expensive until now, but from now on, rare earth elements are desired to be recovered from a dilute aqueous solution of rare earth elements which have been discarded so far. That is, in a process of recovering rare earth elements from low-grade natural minerals and wastes, there is desired a method of selectively separating rare earth element ions in a dilute state from an aqueous solution containing metal ions of base metals, such as iron, copper, nickel, and zinc, at a high concentration.

On the other hand, diglycolamic acid is known as an extractant in solvent extraction for selectively separating rare earth element ions and base metal ions (Non Patent Literatures 1 and 2). However, it is well known that when the extractant in solvent extraction is immobilized on a base material, an expected selective separation effect will not be obtained (Patent Literature 5 (paragraph 0009) and Non Patent Literature 3 (p. 90, 2.2)).

An extractant used in a liquid phase system can freely move in the solution and has high intramolecular degree of freedom. Therefore, it has a high diffusion rate and exhibits a high selectivity to a target substance. On the other hand, if a functional group is immobilized, the degree of freedom may be lost, and the selectivity, the adsorption amount, and the rate may be greatly reduced. Particularly in the case of a polydentate system in which high selectivity can be expected, the above tendency is remarkable and a defect.

An impregnation method is a technique of immobilizing an extractant on a base material which improves the above defect. This is a method of impregnating a hydrophobic base material with an organic solvent containing an extractant, in which the original selectivity of the extractant is maintained since the degree of freedom of the extractant is not reduced.

However, since the extractant is held by a physical interaction such as distribution in a solvent, the extractant may be leaked, and the repeated use thereof is difficult. Further, the adsorption rate is small since the interfacial area is small.

CITATION LIST

Patent Literature

[Patent Literature 1]
Japanese Patent Laid-Open No. 2012-184503
[Patent Literature 2]
Japanese Patent Laid-Open No. 2009-249674
[Patent Literature 3]
Japanese Patent Laid-Open No. 2011-231366
[Patent Literature 4]
Japanese Patent Laid-Open No. 2013-001964
[Patent Literature 5]
Japanese Patent Laid-Open No. 2009-160495

Non Patent Literature

[Non Patent Literature 1]
H. Naganawa et al., "A New "Green" Extractant of the Diglycol Amic Acid Type for Lanthanides", Solvent Extraction Research and Development, Japan, Vol. 14, 151-159 (2007)
[Non Patent Literature 2]
Y. Baba et al., "Selective Recovery of Dysprosium and Neodymium Ions by a Supported Liquid Membrane Based on Ionic Liquids", Solvent Extraction Research and Development, Japan, Vol. 18, 193-198 (2011)
[Non Patent Literature 3]
Hideyuki Matsunaga, "Recognition, separation and concentration of metal ions with chelating resins or chelating reagent impregnated resins" (Review), Bunseki Kagaku, Vol. 50, No. 2, pp. 89-106 (2000)

SUMMARY OF INVENTION

Technical Problem

Thus, an object of the present invention is to provide an adsorbent for rare earth element and a method for recovering a rare earth element, in which a rare earth element contained in an aqueous solution can be simply and inexpensively adsorbed and recovered, and a rare earth element present in an aqueous solution in combination with a base metal can be selectively adsorbed and recovered. Further, another object of the present invention is to provide an adsorbent which is imparted with resistance to repeated use while maintaining high selectivity, a high adsorption amount, and a high adsorption rate.

Solution to Problem

As a result of intensive studies to achieve the above objects, diglycolamic acid has been found as an adsorption site that shows selectivity to a rare earth element, and the above objects have been achieved by introducing diglycolamic acid into a base material (a general-purpose material such as silica gel and polymer particles).

More specifically, the present invention comprises the following.

(1)

An adsorbent for rare earth element which is located in an aqueous phase and brought into contact with an aqueous solution containing a rare earth element to adsorb and recover the rare earth element, the adsorbent comprising a base material and diglycolamic acid introduced into the base material.

(2)

The adsorbent for rare earth element according to (1), wherein the diglycolamic acid has been introduced into the base material by allowing diglycolic acid or diglycolic anhydride to react with a carrier having a primary amine and/or a secondary amine on the base material.

(3)

The adsorbent for rare earth element according to (2), wherein the carrier is one selected from among poly(allylamine), polyethyleneimine, and chitosan.

(4)

The adsorbent for rare earth element according to (1) or (2), wherein the base material is polyethylene or polypropylene.

(5)

The adsorbent for rare earth element according to (1) or (2), wherein the base material is silica.

(6)

The adsorbent for rare earth element according to (2), wherein the base material is silica, and the primary amine and/or the secondary amine is alkylamine.

(7)

A method for recovering a rare earth element comprising: bringing an aqueous solution containing a rare earth element into contact with an adsorbent for rare earth element according to any one of (1) to (6) to allow the rare earth element to be adsorbed on the adsorbent for rare earth element; and desorbing the rare earth element adsorbed on the adsorbent for rare earth element with an acid of 1 N or less.

(8)

The method for recovering a rare earth element according to (7), wherein the acid is hydrochloric acid.

(9)

The method for recovering a rare earth element according to (8), wherein the aqueous solution containing a rare earth element is a mixed aqueous solution containing a rare earth element and a base metal in which pH is not adjusted, and the rare earth element is selectively adsorbed and recovered from the mixed aqueous solution.

Advantageous Effects of Invention

In the adsorbent for rare earth element according to the present invention, only a site having selectivity to rare earth elements (diglycolamic acid) in the chemical structure of a conventional extractant (Non Patent Literature 1) which has been used in a liquid phase system is immobilized on a solid phase (base material). Thereby, a new excellent point (a process advantage on a dilute solution) was able to be developed, leaving excellent points (selectivity to rare earth elements and adsorption ability in a low pH region) observed in the conventional extractant as a function. Further, since diglycolamic acid is introduced into a base material surface by chemical bonds, the adsorbent for rare earth element according to the present invention has a higher adsorption rate than conventional adsorbents (FIG. 12) and can be repeatedly used (FIG. 14).

That is, a rare earth element can be recovered simply and inexpensively even from an aqueous solution in which the rare earth element is in a dilute state. Further, as shown in Examples 3 to 5, the adsorbent for rare earth element according to the present invention has high selectivity to rare earth elements even in the presence of a base metal in combination with the rare earth elements, and shows adsorption ability even in a low pH aqueous solution, for example, at a pH of 1.0. Further, as shown in Example 6, since a rare earth element can be easily desorbed with an acid of 1 N, the desorption (recovery) after adsorbing the rare earth element is extremely easy. Further, as shown in Example 7, each light rare earth element has a different adsorption percentage, which can be applied to mutual separation of light rare earth elements.

Therefore, a rare earth element can be recovered also from an aqueous solution containing the rare earth element which has been discarded until now, and the recycling efficiency of the rare earth element can be increased.

BRIEF DESCRIPTION OF DRAWINGS

FIG. 1(2) is an explanatory view of a carrier other than (1). FIG. 1(3) is a view showing the structural formula of diglycolic acid.

FIG. 11 shows the results of investigation on the specific surface area, the average pore size, and the whole pore volume of amino-silica gel and an adsorbent D.

DESCRIPTION OF EMBODIMENTS

In the present invention, in order to solve the above problems, functional groups were first as densely distributed as possible by using a material having a plurality of functional groups in the molecule or by increasing the amount of functional groups to be introduced because a plurality of functional groups relative to one rare earth element ion are necessary for allowing rare earth elements to be adsorbed. Next, in order to increase the adsorption rate, an adsorbent was designed so that an adsorption site might be located on the surface of a base material. Further, the specific surface area was increased by using a porous body as a base material, thus increasing also the adsorption amount. In order to allow repeated use, functional groups were introduced by chemical bonds.

Hereinafter, the embodiments of the present invention will be described in detail with reference to the accompanying drawings. However, the present invention is not limited to these embodiments. Note that, hereinafter, an adsorbent for rare earth element of the present invention may be referred to only as an adsorbent. First, the structure and preparation method of an adsorbent for rare earth element of the present invention will be described with reference to FIG. 1.

Figure 1:
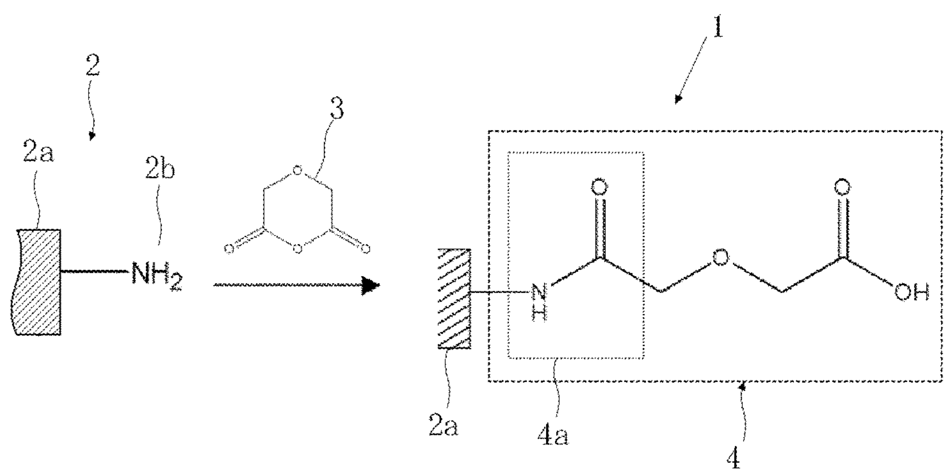
FIG. 1(1) is a view showing a method for preparing an adsorbent for rare earth element.
Figure 1:
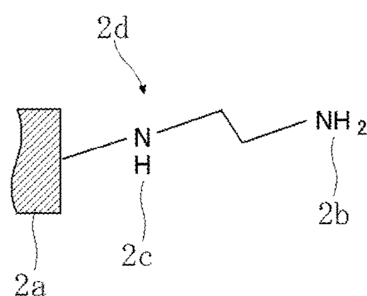
Figure 1:
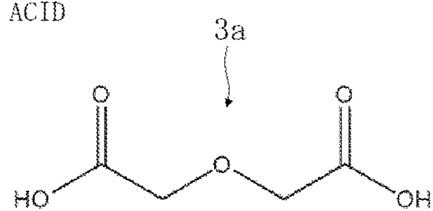

As shown in FIG. 1, an adsorbent for rare earth element 1 of the present invention is an adsorbent to be brought into contact with an aqueous solution containing a rare earth element to adsorb and recover the rare earth element. The adsorbent for rare earth element 1 is prepared by introducing diglycolamic acid 4 into a carrier 2.

FIG. 1(1) is a schematic diagram showing an example of the preparation method of the adsorbent for rare earth element 1. The carrier 2 has a primary amine 2*b* on a base material 2*a*. Then, the diglycolamic acid 4 (inside the dashed line) is introduced into (bonded to) the base material 2*a* through an amide group 4*a* (inside the dotted line) by mixing diglycolic anhydride 3 with the carrier 2. Further, as shown in FIG. 1(2), a material having both a primary amine 2*b* and a secondary amine 2*c* can also be used as another carrier 2*d*, in which diglycolic acid 3*a* is bonded to both the primary amine 2*b* and the secondary amine 2*c*.

The carrier 2 may be of any material and shape as long as it has the primary amine 2*b* and/or the secondary amine 2*c* and has mechanical strength, acid resistance, and insolubility in an aqueous solution. Examples of the shape of the carrier 2 include, but are not particularly limited to, a particulate shape, a plate shape, a bar shape, a tubular shape, a fibrous shape, and a film shape.

Examples of the base material 2*a* include polymers having a primary amine and/or a secondary amine such as poly(allylamine), polyethyleneimine, and chitosan. Further examples of the base material 2*a* include particles, films, and the like of a general-purpose polymer such as polyethylene and polypropylene to which a primary amine and/or a secondary amine is added (bonded or the like) and silica to the surface of which is bonded alkylamine.

For introducing diglycolamic acid 4 which is an adsorption site of a rare earth element, diglycolic anhydride 3 was used in FIG. 1(1), but it is also possible to use diglycolic acid 3*a* shown in FIG. 1(3). Diglycolic acid 3*a* is preferred since it is less expensive than diglycolic anhydride 3.

Hereinafter, a specific method for preparing an adsorbent according to the present invention, adsorption test, and recovery test will be described.

Example 1

Preparation of Adsorbent A

To a solution in which polyethyleneimine was dissolved in methanol, was added silica gel to impregnate the silica gel with polyethyleneimine, and the resulting reaction product was filtered, sufficiently washed with methanol and water, and dried under reduced pressure.

Next, the polyethyleneimine-impregnated silica gel was added to a glutaraldehyde aqueous solution to crosslink the polyethyleneimine in the silica gel, and the resulting reaction product was filtered, sufficiently washed with water, and dried under reduced pressure.

Next, the polyethyleneimine-impregnated silica gel (carrier) crosslinked with glutaraldehyde was added to a diglycolic anhydride-ethanol solution and allowed to react with each other at 25° C. for 3 days. The resulting reaction product was filtered, sufficiently washed with ethanol and water, and dried under reduced pressure to obtain an adsorbent A.

[Adsorption Test of Adsorbent A]

To 5 ml of an aqueous solution for adsorption test containing 20 ppm each of dysprosium and neodymium as rare earth elements, was added 50 mg of the adsorbent A, and the mixture was subjected to adsorption test at 25° C. with shaking.

After the lapse of a predetermined period of time, the solution was collected, filtered with a 0.20-μm membrane filter, and measured for the metal ion concentration in the aqueous solution using an ICP atomic emission spectrometer. The adsorption percentage (5) of metal ions on the adsorbent was calculated from the mass balance. As a result, the adsorption percentage of dysprosium was 96.3%, and the adsorption percentage of neodymium was 65.2%.

Example 2

Preparation of Adsorbent B

A commercially available chelating resin, DIAION CR20 (a polyamine type, manufactured by Mitsubishi Chemical Corporation) (carrier) was added to a solution of diglycolic anhydride in ethanol and allowed to react with each other at 25° C. for 3 days. The resulting reaction product was filtered, sufficiently washed with ethanol and water, and dried under reduced pressure to obtain an adsorbent B.

[Adsorption Test of Adsorbent B]

To 5 ml of an aqueous solution for adsorption test containing 100 ppm each of dysprosium (Dy) and neodymium (Nd) as rare earth elements and 100 ppm each of iron, copper, and zinc as base metals, was added 50 mg of the adsorbent B, and the mixture was subjected to adsorption test at 25° C. with shaking.

Figure 2:
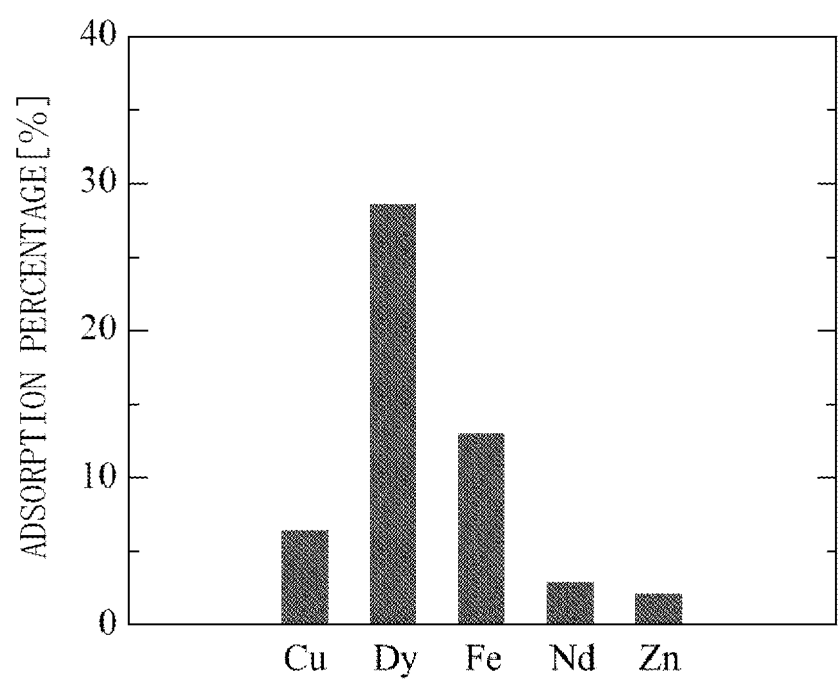
FIG. 2 is a graph showing the adsorption percentage of each rare earth element when an adsorbent for rare earth element B was used.

After the lapse of a predetermined period of time, the solution was collected, and the adsorption percentage (%) of metal ions on the adsorbent was calculated in the same manner as in Example 1. The results are shown in FIG. 2. The axis of ordinates in FIG. 2 shows the adsorption percentage (%) of each element, and the axis of abscissas shows each elemental species.

As shown in FIG. 2, it was found that a rare earth element dysprosium was able to be more selectively recovered than base metals such as iron, copper, and zinc by using the adsorbent B.

Example 3

Preparation of Adsorbent C

A commercially available amino-silica gel, 3-Aminopropyl Silica Gel (manufactured by Tokyo Chemical Industry Co., Ltd.) (carrier) was added to a solution of diglycolic anhydride in dichloromethane and allowed to react with each other at 25° C. for 3 days. The resulting reaction product was filtered, sufficiently washed with dichloromethane, ethanol, and water, and dried under reduced pressure to obtain an adsorbent C.

[Preparation of Adsorbent D, E, and F]

In the same manner as in the adsorbent C, an adsorbent D was obtained using 3-(Ethylenediamino)propyl Silica Gel (manufactured by Tokyo Chemical Industry Co., Ltd.) as a carrier; an adsorbent E was obtained using 3-(Ethylenediamino)propyl-functionalized silica gel (manufactured by Aldrich Chemical Co.) as a carrier; and an adsorbent F was obtained using 3-(Diethylenetriamino)propyl-functionalized silica gel (manufactured by Aldrich Chemical Co.) as a carrier.

[Adsorption Test of Adsorbents C to F]

To 5 ml of an aqueous solution for adsorption test containing 100 ppm each of dysprosium and neodymium as rare earth elements and 100 ppm each of iron, copper, and zinc as base metals, the solution being adjusted to an arbitrary pH, was added 50 mg of each of the adsorbents C to F, and the mixture was subjected to adsorption test at 25° C. with shaking.

Figure 3:
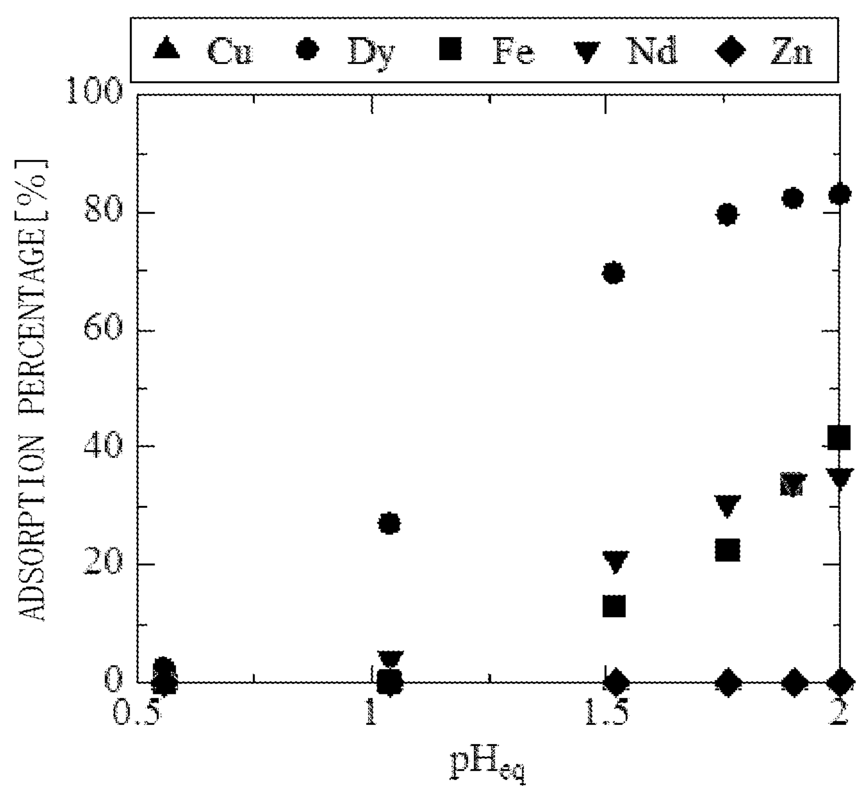
FIG. 3 shows the results of investigation on the pH dependency of the adsorption percentage of each rare earth element when an adsorbent for rare earth element C was used in a mixed system of a rare earth element and a base metal.
Figure 4:
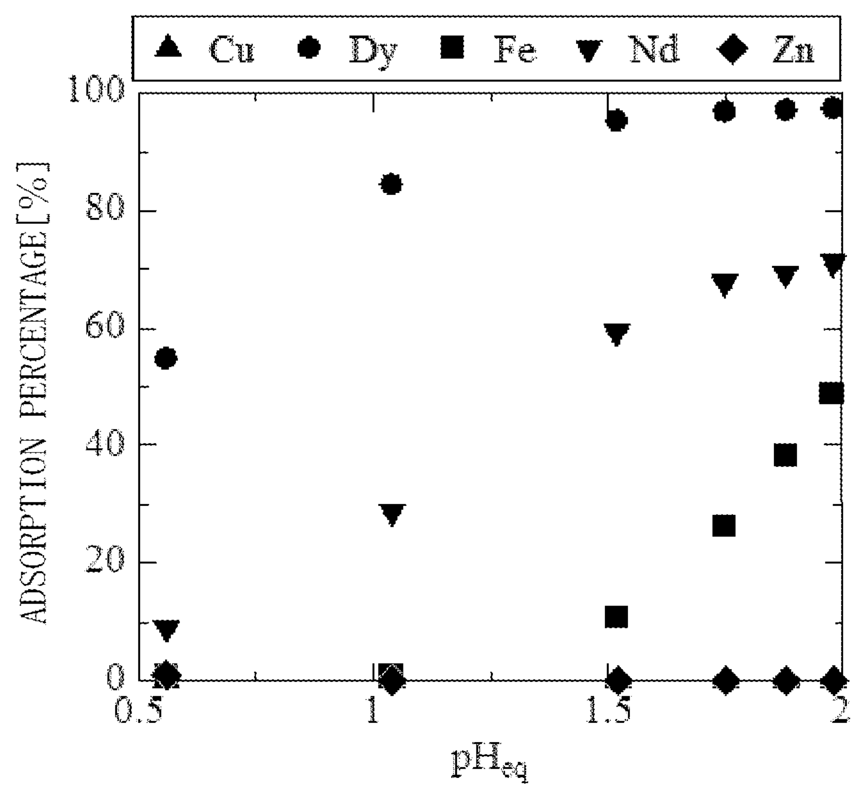
FIG. 4 shows the results of investigation on the pH dependency of the adsorption percentage of each rare earth element when an adsorbent for rare earth element D was used in a mixed system of a rare earth element and a base metal.
Figure 5:
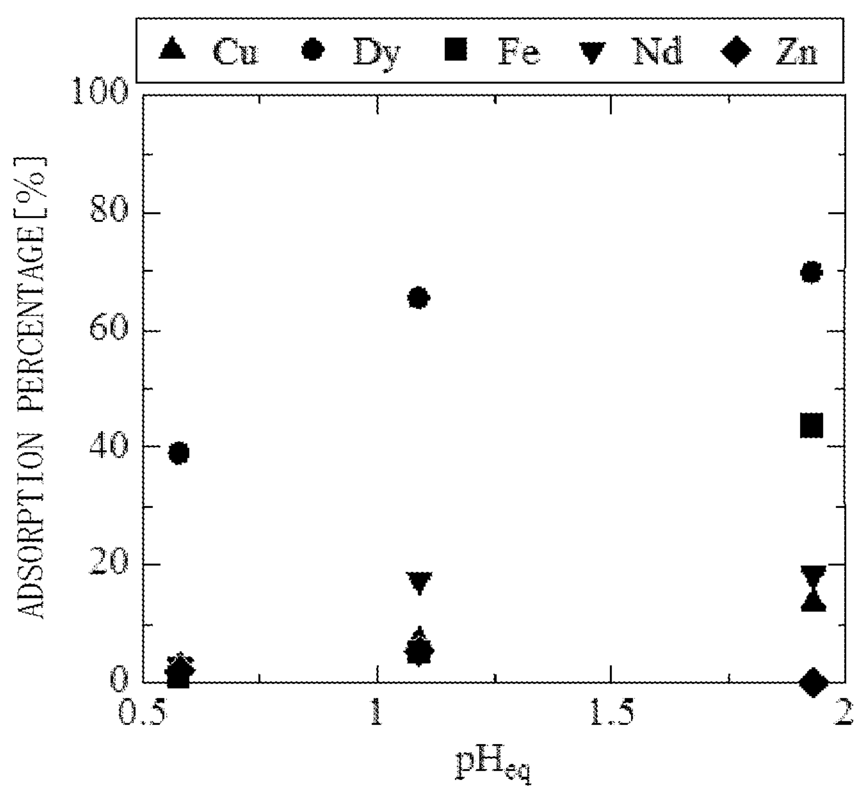
FIG. 5 shows the results of investigation on the pH dependency of the adsorption percentage of each rare earth element when an adsorbent for rare earth element E was used in a mixed system of a rare earth element and a base metal.
Figure 6:
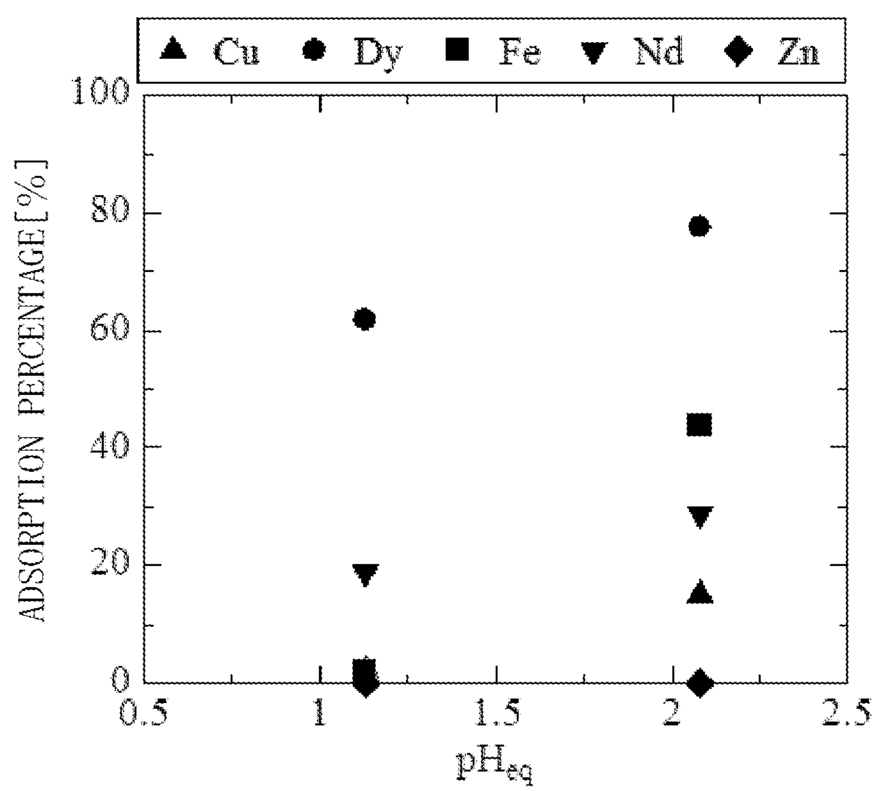
FIG. 6 shows the results of investigation on the pH dependency of the adsorption percentage of each rare earth element when an adsorbent for rare earth element F was used in a mixed system of a rare earth element and a base metal.

After the lapse of a predetermined period of time, the solution was collected, and the adsorption percentage (%) of metal ions on the adsorbent was calculated in the same manner as in Example 1. The results are shown in FIG. 3 (adsorbent C), FIG. 4 (adsorbent D), FIG. 5 (adsorbent E), and FIG. 6 (adsorbent F). The axis of ordinates in each Figure shows the adsorption percentage (%), and the axis of abscissas shows the pH value of an aqueous solution during adsorption equilibrium.

As shown in FIGS. 3 to 6, the adsorption of copper and zinc on the adsorbent for rare earth element of the present invention was not observed in the pH range tested. With respect to other ions, the adsorption percentage increased as the pH increased. The adsorption of iron was observed at a $pH_{eq}$ of 1.5 or more, and the adsorption of neodymium was observed at a $pH_{eq}$ of 0.5 or more. Further, it was found that the adsorbent of the present invention showed a high adsorption capacity for dysprosium even at a $pH_{eq}$ of 1.

Example 4

Adsorption Test of Adsorbent D (Influence of pH)

To 5 ml of an aqueous solution for adsorption test containing 100 ppm each of dysprosium and neodymium as rare earth elements and 100 ppm each of iron, copper, and zinc as base metals, the initial pH of the solution being adjusted to was added 50 mg of the adsorbent D, and the mixture was subjected to adsorption test at 25° C. with shaking.

Figure 7:
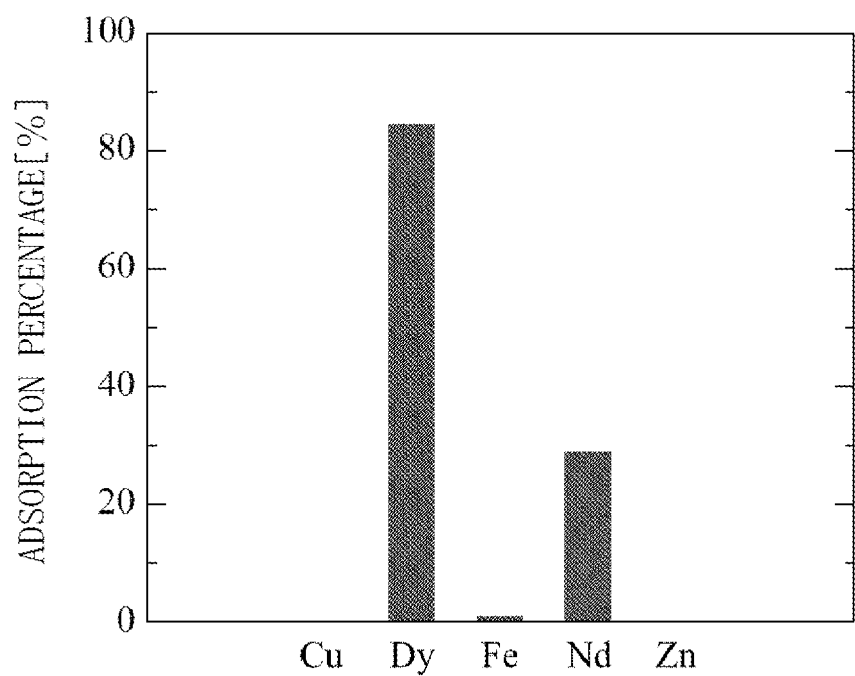
FIG. 7 shows the results of investigation on the adsorption percentage of each rare earth element when the adsorbent for rare earth element D was used at a pH of 1.0.

After the lapse of a predetermined period of time, the solution was collected, and the adsorption percentage (%) of metal ions on the adsorbent was calculated in the same manner as in Example 1. The results are shown in FIG. 7. The axis of ordinates in FIG. 7 shows the adsorption percentage (%) of each element, and the axis of abscissas shows each elemental species.

As shown in FIG. 7, the adsorption of iron, copper, and zinc which are base metals was not substantially observed. On the other hand, it was found that the adsorbent D showed a high adsorption capacity for dysprosium and neodymium which are rare earth elements even in a low pH region of pH 1, and had high adsorption selectivity to rare earth elements in a system in which base metals are present in combination with rare earth elements.

Example 5

Adsorption Test of Adsorbent D (Measurement of Saturated Adsorption Amount)

To 5 ml of an aqueous solution of dysprosium which is adjusted to arbitrary metal ion concentration and arbitrary pH, was added 50 mg of the adsorbent D, and the mixture was subjected to adsorption test at 25° C. with shaking.

After the lapse of a predetermined period of time, the solution was collected, and the adsorption amount of metal ions on the adsorbent was calculated in the same manner as in Example 1.

Figure 8:
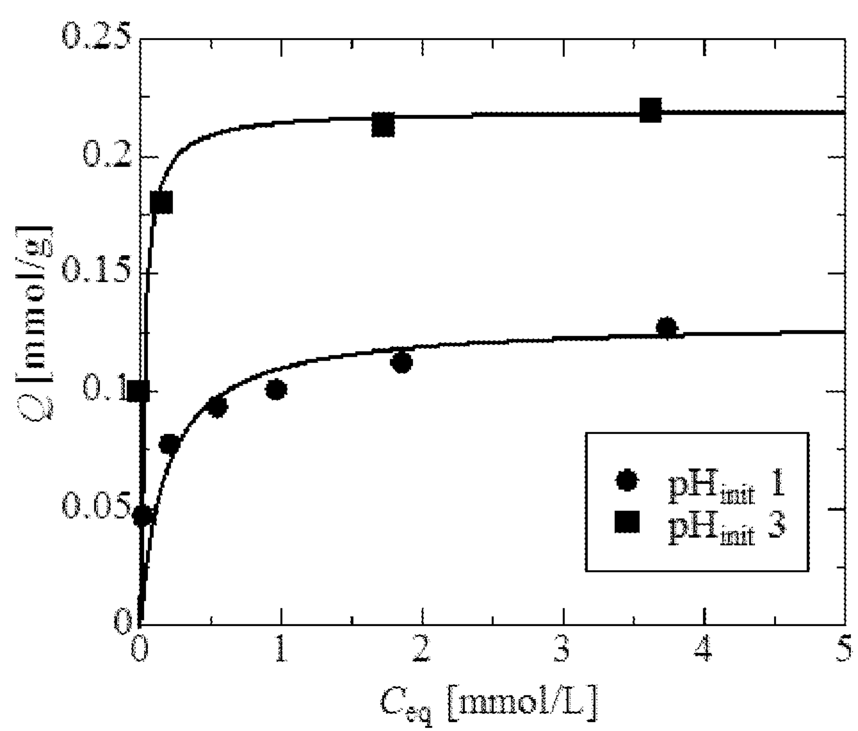
FIG. 8 shows a dysprosium adsorption isotherm when the adsorbent for rare earth element D was used at each initial pH.

Then, as shown in FIG. 8, the adsorption amount of dysprosium was plotted against the concentration of dysprosium during adsorption equilibrium. In FIG. 8, the axis of ordinates indicates the adsorption amount of dysprosium per unit dry weight of an adsorbent (Q [mmol/g]), and the axis of abscissas indicates the concentration of dysprosium in an aqueous solution during equilibrium (Ceq [mmol/L]).

When these results were correlated by the Langmuir equation to calculate the saturated adsorption amount of dysprosium, the saturated adsorption amount of dysprosium was found to be 0.130 mmol/g (21.1 mg/g) and 0.220 mmol/g (35.7 mg/g) at an initial pH of 1 and 3, respectively. Thus, a high adsorption amount was observed even in a low pH region.

Example 6

Preparation of Adsorbent G

To 10 ml of an aqueous solution of dysprosium, the initial pH of the solution being adjusted to 1, was added 100 mg of the adsorbent D, and the mixture was subjected to adsorption test at 25° C. with shaking.

After the lapse of a predetermined period of time, the solution was collected, and the adsorption amount (%) of metal ions on the adsorbent was calculated in the same manner as in Example 1. Then, the adsorbent was filtered, washed with water, and dried under reduced pressure to obtain an adsorbent G.

[Recovery Test from Adsorbent G Prepared by Allowing Rare Earth Element (Dysprosium) to be Adsorbed on Adsorbent D]

To 5 mL of a hydrochloric acid aqueous solution adjusted to an arbitrary pH, was added 10 mg of the adsorbent G, and the mixture was shaken at 25° C.

Figure 9:
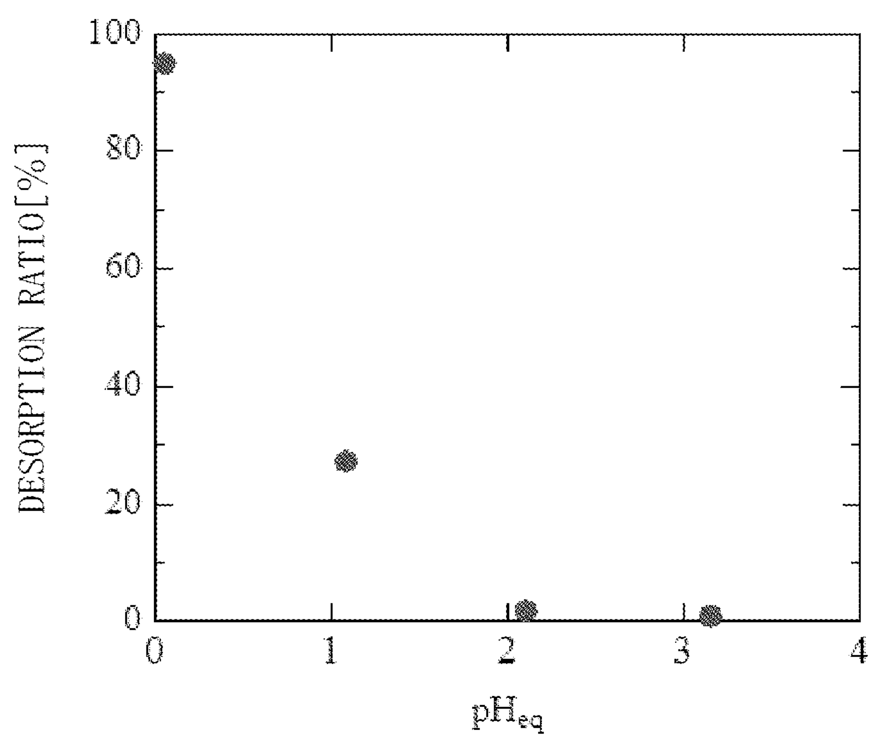
FIG. 9 shows the results of investigation on the desorption ratio from the adsorbent for rare earth element D on which Dy is adsorbed.

After the lapse of a predetermined period of time, the solution was collected, filtered with a 0.20-μm membrane filter, and measured for the metal ion concentration in the aqueous solution using an ICP atomic emission spectrometer. The desorption ratio of dysprosium ions was calculated from the mass balance. The results are shown in FIG. 9. The axis of ordinates in FIG. 9 shows the desorption ratio (%), and the axis of abscissas shows the arbitrarily adjusted pH values of the hydrochloric acid aqueous solution.

It was observed that the desorption ratio of dysprosium increased as the pH of hydrochloric acid was reduced, and that the adsorbed dysprosium can be easily and almost quantitatively collected with 1 mol/L (1 N) of hydrochloric acid.

Example 7

Separation and Recovery of Rare Earth Element, Application of Extraction

To 5 ml of an aqueous solution for adsorption test containing 20 ppm each of 14 types of lanthanoid ions excluding promethium (lanthanum, cerium, praseodymium, neodymium, samarium, europium, gadolinium, terbium, dysprosium, holmium, erbium, thulium, ytterbium, and lutetium), the initial pH of the solution being adjusted to 1, was added the adsorbent D, and the mixture was subjected to adsorption test with shaking.

Figure 10:
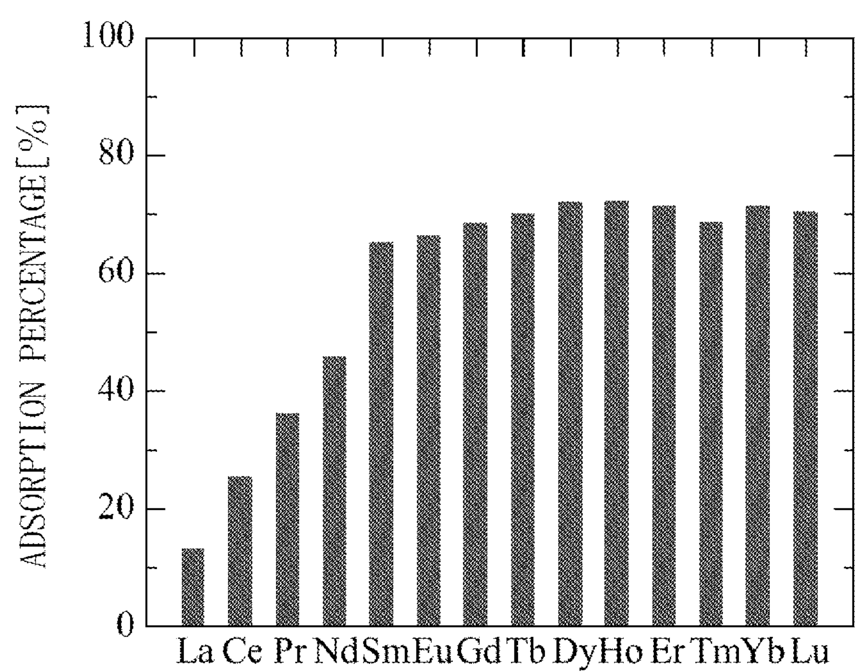
FIG. 10 shows the results of investigation on the adsorption percentage of each rare earth element when the adsorbent for rare earth element D was used.

After the lapse of a predetermined period of time, the aqueous solution was collected, and the adsorption percentage of metal ions on the adsorbent was calculated in the same manner as in Example 1. The results are shown in FIG. 10. The axis of ordinates in FIG. 10 shows the adsorption percentage (%), and the axis of abscissas shows the elements to be inspected.

It was found that, as the tendency of adsorption, the adsorbent D had higher adsorption percentage for light rare earth elements from lanthanum to neodymium as the atomic number increases. On the other hand, the adsorbent D had uniformly high adsorption percentage for medium-to-heavy rare earth elements after samarium.

From these findings, the possibility of mutual separation between rare earth elements was verified in the light rare earth elements from lanthanum to samarium. Particularly, the possibility of separating industrially important praseodymium and neodymium was verified.

Example 8

Next, the specific surface area, the average pore size, and the whole pore volume of the adsorbent D prepared and amino-silica gel, 3-(Ethylenediamino)propyl Silica Gel, (carrier) before introducing diglycolamic acid were investigated with conventional techniques. The results are shown in FIG. 11.

As shown in FIG. 11, it was found that the specific surface area, the average pore size, and the whole pore volume of the amino-silica gel were not substantially changed, and the pores were not blocked even when diglycolamic acid was introduced into the amino-silica gel by chemical bonds. This means that diglycolamic acid is introduced even into the silica gel (base material) surface in the inner part of the carrier. Thereby, the high adsorption rate of rare earth elements can be achieved.

Example 9

Next, the adsorbent D was investigated for the adsorption rate. To an aqueous solution for adsorption test adjusted to a dysprosium concentration of 1 mM and a pH of 1, was added the adsorbent D prepared, and the mixture was subjected to adsorption test at 298K with shaking. The solution was collected after an arbitrary time period, filtered with a 0.20-μm membrane filter, and measured for the metal ion concentration in the aqueous solution using an ICP atomic emission spectrometer. The adsorption percentage of metal ions was calculated from the mass balance. The results are shown in FIG. 12.

Figure 12:
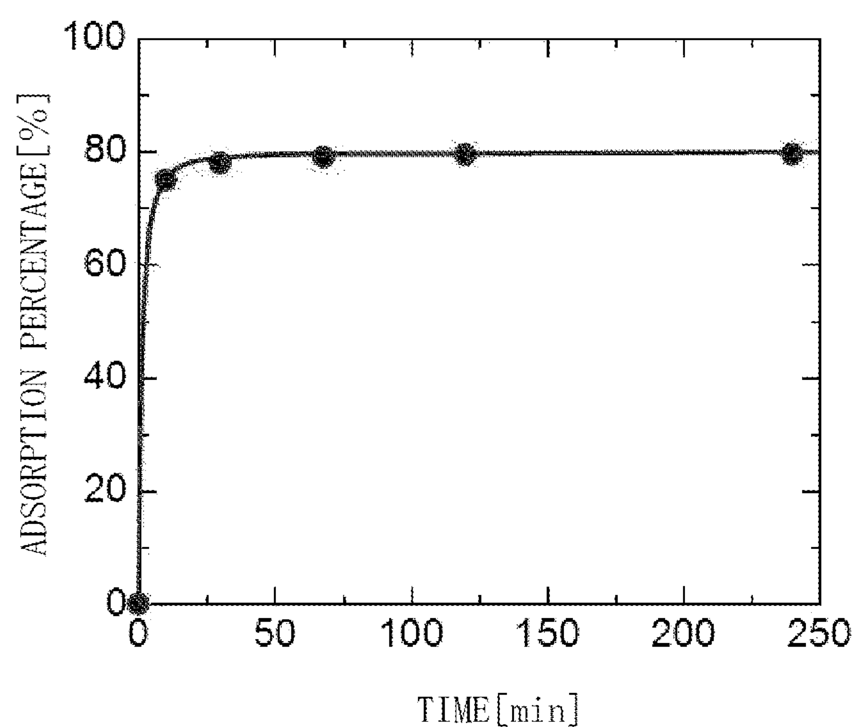
FIG. 12 shows the results of investigation on the change of the dysprosium adsorption percentage with time when an adsorbent D was used.

As apparent from the change of the dysprosium adsorption percentage with time when the adsorbent D was used as shown in FIG. 12, the equilibrium adsorption was almost reached 10 minutes after the start of adsorption. This adsorption rate is sufficiently practical even if it is compared with commercially available ion-exchange resins and the like.

Example 10

Figure 13:
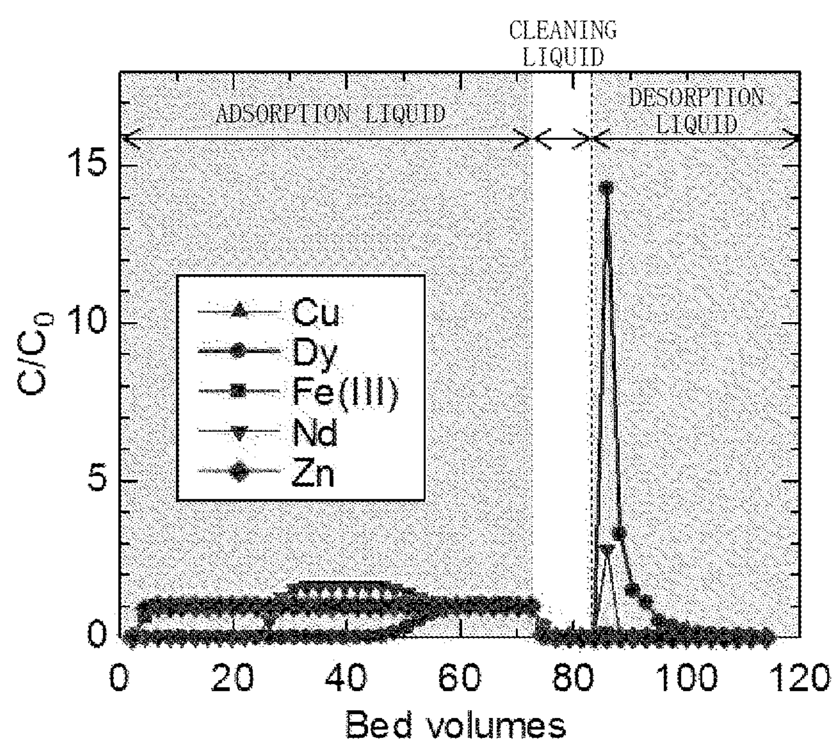
FIG. 13 shows the column test results of rare earth elements and base metals when an adsorbent D was used.

Next, the adsorbent D was investigated for adsorption selectivity. A glass column having an inside diameter of 8 mm was filled with 1 g of the adsorbent D prepared (the height of the filled layer: 3.6 cm), and a hydrochloric acid aqueous solution adjusted to a pH of 1 was sufficiently passed through the column. An aqueous solution containing dysprosium and neodymium as rare earth elements and iron, copper, and zinc as base metals (the concentration of each metal ion: 1 mM, and the initial pH: 1) was passed through the column filled with the adsorbent at a constant flow rate (0.25 mL/min), and the effluent was collected. Subsequently, a cleaning liquid (a hydrochloric acid aqueous solution having a pH of 2) and a desorption liquid (a 2 M hydrochloric acid aqueous solution) were successively passed through the column, and the effluent was collected. Each fraction collected was measured for the metal ion concentration in the aqueous solution using an ICP atomic emission spectrometer. The adsorption amount of metal ions was calculated from the mass balance. The results are shown in FIG. 13.

Immediately after the adsorption liquid was passed through the column, copper, iron, and zinc which are base metals flowed out without interacting with the adsorbent D in the column. On the other hand, dysprosium and neodymium which are rare earth elements were held in the column. When the amount of the adsorption liquid reached a certain level, neodymium reached a breakthrough point and started to flow out at a concentration higher than the initial concentration. This is probably because dysprosium has higher adsorptivity to the adsorbent D than neodymium, and adsorbed neodymium was replaced by dysprosium. When the 2 M hydrochloric acid aqueous solution was passed through the column for desorption after dysprosium reached a breakthrough point, copper, iron, and zinc which are base metals were not substantially contained in the desorption liquid, and only rare earth elements was able to be recovered. Dysprosium was concentrated to about 15 times the initial concentration.

Example 11

Figure 14:
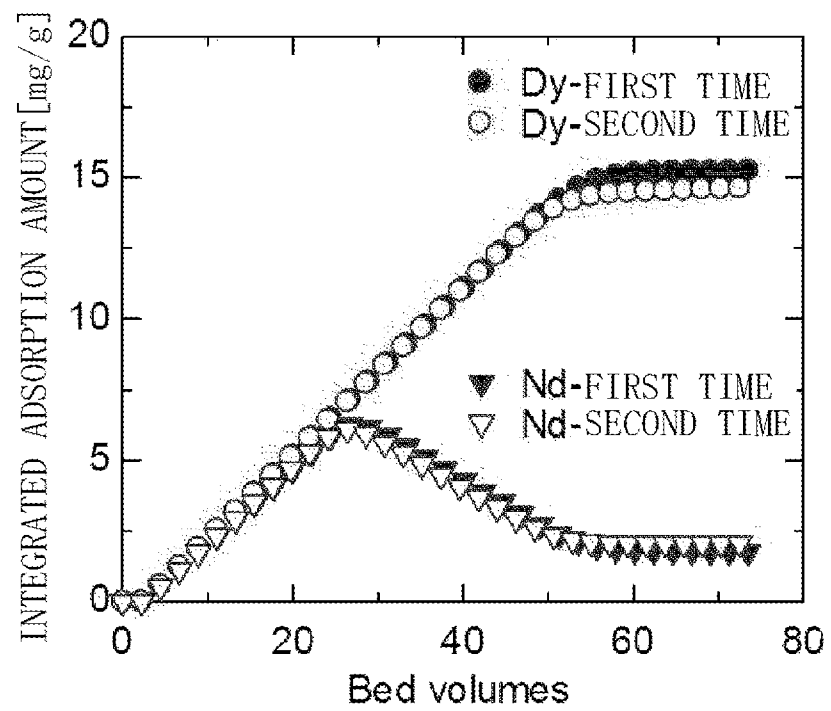
FIG. 14 is the results of investigation on the integrated adsorption amount of dysprosium and neodymium when an adsorbent D was used.

Next, the adsorbent D was investigated for the resistance to repeated use. In order to check the degradation in the repeated use of the adsorbent D, the same column test as in Example 10 was performed again. The behavior of the adsorption and desorption of each element was almost the same between the first time and the second time. FIG. 14 shows the integrated adsorption amount of dysprosium and neodymium.

As shown in FIG. 14, the integrated adsorption amount when dysprosium reached a breakthrough point was Dy: 15.25 mg/g and Nd: 1.760 mg/g at the first time and Dy: 14.63 mg/g and Nd: 2.080 mg/g at the second time. It was found that the adsorbent D was able to be repeatedly used because there was substantially no difference in the adsorption amount for both dysprosium and neodymium.

INDUSTRIAL APPLICABILITY

According to the present invention, rare earth elements can be selectively, simply, and inexpensively recovered from an aqueous solution, even from a dilute aqueous solution, containing rare earth elements. Therefore, the present invention can further develop the smelting and the recycling industry of rare earth elements.

REFERENCE SIGNS LIST

1 Rare earth element adsorbent
2 Carrier
**2*a*** Base material
**2*b*** Primary amine
**2*c*** Secondary amine
**2*d*** Carrier
3 Diglycolic Anhydride
**3*a*** Diglycolic acid
4 Diglycolamic Acid
**4*a*** Amide group

The invention claimed is:

1. An adsorbent for rare earth element which is brought into contact with an aqueous solution containing a rare earth element to adsorb and recover the rare earth element, the adsorbent comprising:

a base material; and diglycolamic acid introduced into the base material, wherein the base material is polyethylene or polypropylene.

2. The adsorbent for rare earth element according to claim 1, wherein the diglycolamic acid has been introduced into the base material by reacting diglycolic acid or diglycolic anhydride with a carrier having a primary amine and/or a secondary amine on the base material.

3. The adsorbent for rare earth element according to claim 2, wherein the carrier is selected from the group consisting of poly(allylamine), polyethyleneimine, and chitosan.

4. A method for recovering a rare earth element comprising:

bringing an aqueous solution containing a rare earth element into contact with an adsorbent for rare earth element to adsorb the rare earth element on the adsorbent, the adsorbent comprising a base material and diglycolamic acid introduced into the base material; and desorbing the rare earth element with an acid of 1 N or less.

5. The method for recovering a rare earth element according to claim 4, wherein the acid is hydrochloric acid.

6. The method for recovering a rare earth element according to claim 5, wherein the aqueous solution containing a rare earth element is a mixed aqueous solution containing a rare earth element and a base metal in which pH is not adjusted, and the rare earth element is selectively adsorbed and recovered from the mixed aqueous solution.

* * * * *